United States Patent

Stöck et al.

[11] Patent Number: 5,806,609
[45] Date of Patent: Sep. 15, 1998

[54] MANUALLY OPERABLE TOOL FOR DRILLING AND/OR REMOVING MATERIAL IN BRITTLE AND/OR LOW DUCTILE MATERIAL

[75] Inventors: Maximilian Stöck, Azmoos, Switzerland; Werner Kaibach, Buchloe, Germany; Reinhard Schulz, München, Germany; Hans-Werner Bongers-Ambrosius, Iffeldorf, Germany; Ralf Ludwig, Sennwald; Hanspeter Schad, Grabs, both of Switzerland; Edwin Schweizer, Balzers, Liechtenstein

[73] Assignee: Hilti Aktiengesellschaft, Schaan, Liechtenstein

[21] Appl. No.: 621,389

[22] Filed: Mar. 25, 1996

[30] Foreign Application Priority Data

Mar. 24, 1995 [DE] Germany ............... 195 10 964.3

[51] Int. Cl.$^6$ .................................................. B25D 16/00
[52] U.S. Cl. ..................... 173/205; 173/11; 173/128; 173/201; 173/217
[58] Field of Search ................................ 173/109, 110, 173/111, 201, 205, 217, 200, 124, 128

[56] References Cited

U.S. PATENT DOCUMENTS

| 3,114,421 | 12/1963 | McCloud | 173/111 |
|---|---|---|---|
| 3,269,466 | 8/1966 | Mitchell | 173/201 |
| 3,430,709 | 3/1969 | Miller | 173/205 |
| 3,685,594 | 8/1972 | Koehler | 173/205 |
| 4,567,951 | 2/1986 | Fehrle et al. | 173/201 |
| 4,895,212 | 1/1990 | Wache | 173/205 |
| 5,277,259 | 1/1994 | Schmid et al. | 173/205 |

*Primary Examiner*—Scott A. Smith
*Attorney, Agent, or Firm*—Anderson, Kill & Olick, P.C.

[57] ABSTRACT

A manually operable tool, such as a hammer drill, for drilling and/or removing material in at least one of brittle material and low ductile material, has a continuously rotatable chuck (8) and a motor driven striking mechanism (1) for transmitting impulse-like blows to a tool bit (9) held in the chuck (8). The tool includes members (5) for transmitting impulse-like blows composed of superimposed axially-directed blows and torsional blows to the tool bit (9) in the chuck for forming drilling blows. Further, an adaptor can be provided for attachment to the hammer drill containing the members (5) for affording the superimposed blows.

7 Claims, 4 Drawing Sheets

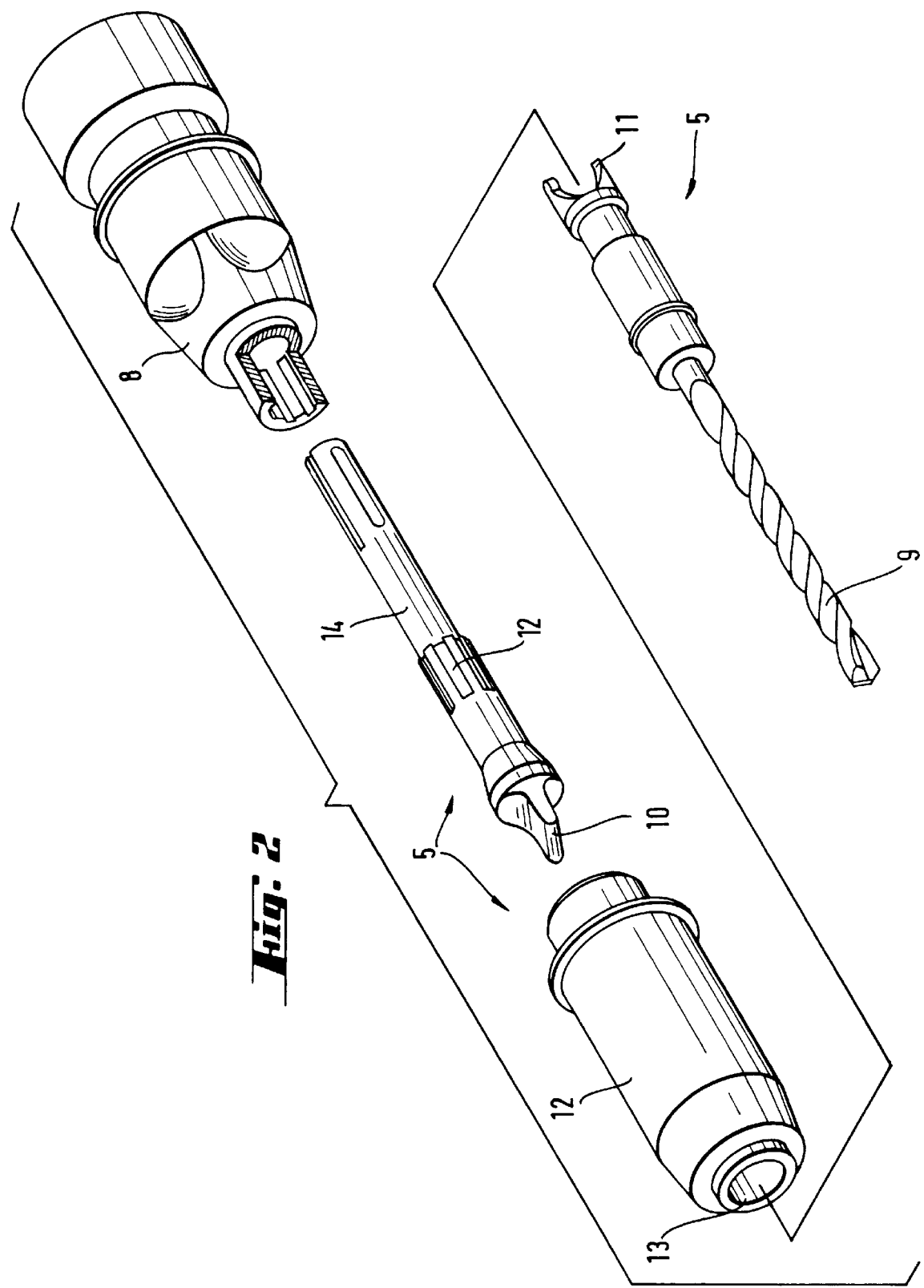

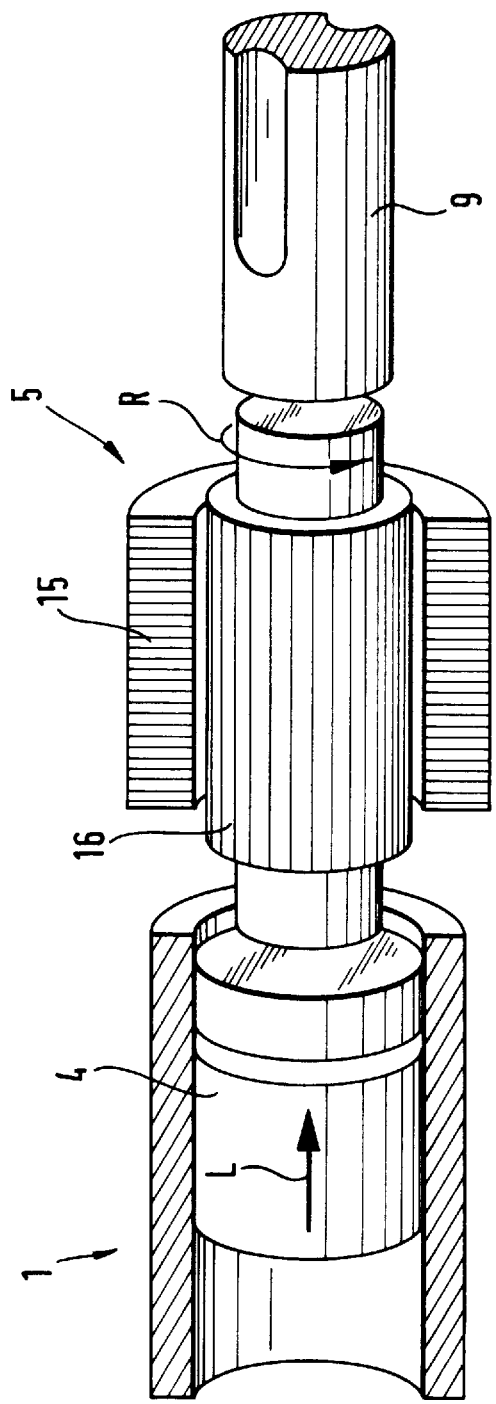

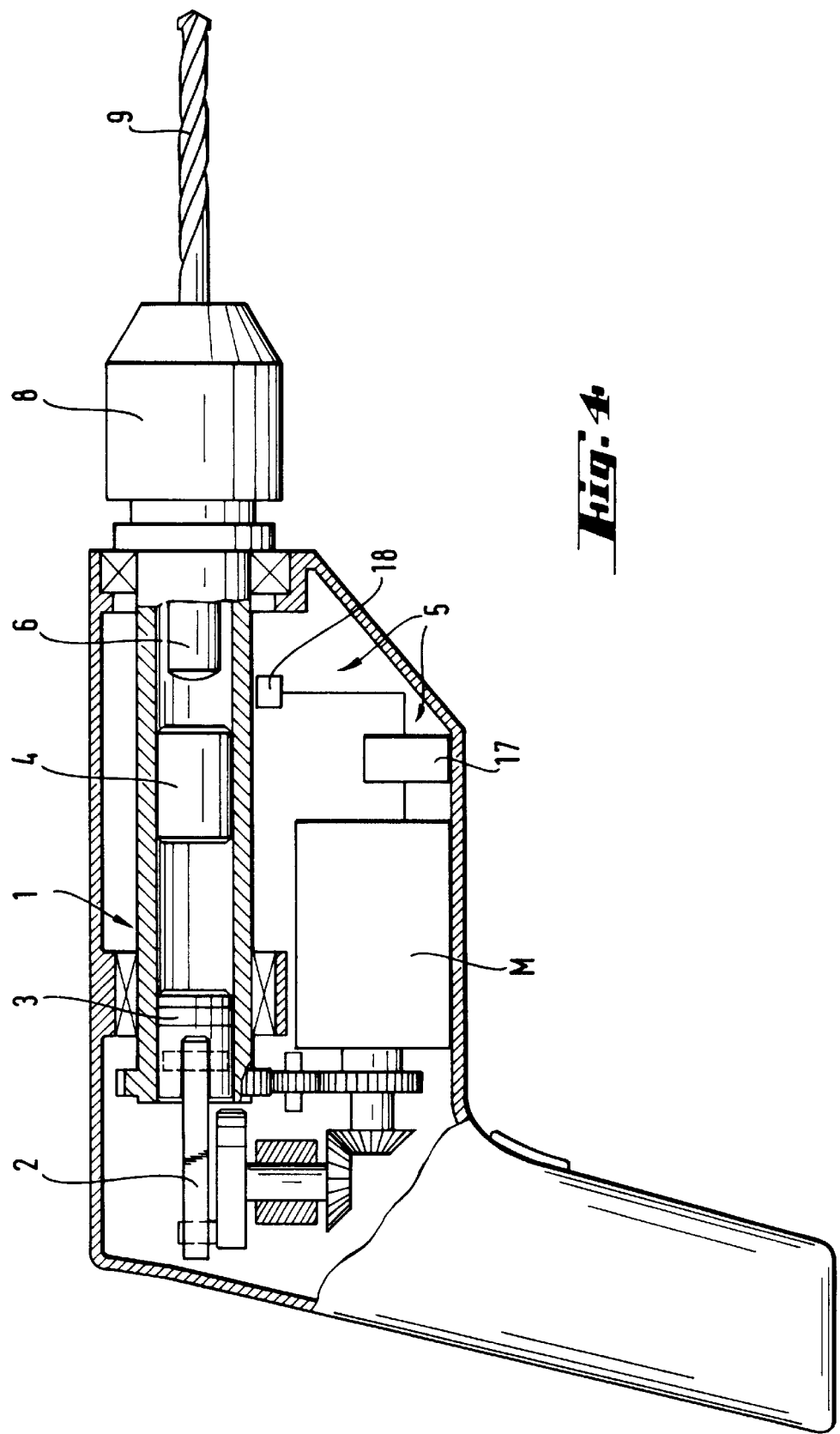

MANUALLY OPERABLE TOOL FOR DRILLING AND/OR REMOVING MATERIAL IN BRITTLE AND/OR LOW DUCTILE MATERIAL

BACKGROUND OF THE INVENTION

The present invention is directed to a manually operable tool, for drilling and/or removing material in at least one of brittle material and low ductile material, such as a hammer drill with a continuously rotating tool bit chuck and a motor driven striking mechanism for transmitting impulse-like blows to a tool bit secured in the tool bit chuck. Further, the invention is also directed to an adaptor to be inserted into the tool bit chuck of a hammer drill containing a striking mechanism for producing axially directed blows.

In the construction industry, for instance, in the installation of equipment and in the electrical trade, it is often necessary to effect removal work on construction materials, such as concrete, with or without reinforcing steel and on other construction materials. As an example, bores or openings for installing attachment members, channels for running lines, recesses for plug-in sockets, and for other items are required. Preferably, manually operated tools along with suitable tool bits are used for this type of work. For cutting bores in minerally based material, such as concrete, rock and masonry, so-called hammer drills have been particularly effective. Hammer drills have a continuously driven tool bit chuck and a motor actuated striking mechanism. In actual operation, an impulse-like blow is transmitted to a continuously rotating tool bit secured in a tool bit chuck so that such blows assist in drilling the base material. In known hammer drills with a large material removal output, the striking mechanism is an electropneumatic-producing mechanism which provides axially directed blows.

These known hammer drills have good material removal properties in purely mineral based materials, such as masonry, rock or concrete, and have been found to be very efficient when used manually in dry drilling operations. When working in reinforced concrete, however, such efficiency can be limited, particularly if the tool bit strikes the reinforcing steel. When hammer drills are used in reinforced concrete, the reinforcing steel is primarily deformed and cold worked by the axially directed blows acting on the tool bit and the material removal output is considerably reduced. Accordingly, it is frequently necessary, when the tool bit strikes the reinforcing steel, to interrupt the drilling operation and attempt to drill a new bore hole at another point in the reinforced concrete base material. Such procedure is unsatisfactory and leads to a considerable loss of time. Blows directed against reinforcing steel occur in a sudden manner when drilling reinforced concrete and often the operator of the tool is unprepared for such a development. When this happens, dangerous situations can arise, because of the suddenly occurring torque peaks.

SUMMARY OF THE INVENTION

Therefore, the primary object of the present invention is to provide a manually operable tool for drilling and/or removing material in at least one of brittle material and low ductile material and, especially, in reinforced concrete base material whereby the base material can be drilled efficiently.

In accordance with the present invention, a manually operated tool for drilling brittle and/or low ductile materials includes a tool bit chuck continuously rotating around an axis and a motor driven striking mechanism for transmitting axially directed impulse blows to a tool bit clamped in the chuck. In addition, means in axial alignment with the tool bit produce impulse-like blows to the tool bit composed of axially directed blow components and torsionally directed blow components superimposed as a drilling blow for transmission to the tool bit which is continuously operating in the chuck.

Due to the superimposition of the axially directed blows and the torsional blow component, the direction of the force vector at the cutting edge of the tool in contact with the base material being drilled, is, for instance, rotated out of the axial direction as distinguished from a hammer drill with only an axially directed blow. Due to the changed direction of the force vector, any reinforcing steel in the base material is cut off when the tool bit strikes the reinforcing steel. As a result, suddenly developing torques where ordinarily the tool bit would jam, can be avoided and the safety of the tool operator can be increased. Further, the shearing action resulting from the drilling blow, assists in the removal of the mineral base material even without reinforcement. Heat generation is reduced due to this cutting or drilling operation and is more favorable as far as the expenditure of energy is concerned, therefore, additional cooling can be avoided especially when drilling large diameter bores in hard base materials.

In accordance with the present invention, when drilling brittle and/or low ductile materials, the drilling can be carried out in a dry operation.

The axially directed shock wave and the torsional shock wave propagate at different velocities in the tool bit. In short tool bits, for instance, of less than 300 mm, the different velocities have hardly any effect. The two waves arrive nearly simultaneously at the tip of the tool bit. In longer tool bits, the different velocities can be used in a targeted manner. In such a case, the tool bit tip penetrates initially into the base material due to the axially directed shock and then the base material is cut by shear due to the lagging torsional waves. The direction of the force vector at the cutting edge of the tool bit depends on the radius of the bit. In the center of the cutting edge, the force always acts in the direction of the tool bit axis independently of its share of the torsional shock. The direction of the force vector at the cutting edge slopes with increasing radius as a function of the share of the torsional blow component. The manually operated tool of the present invention can also be modified, so that the means for producing the drilling blow generates two blow components in a targeted manner whereby they arrive one lagging the other and are offset time-wise, also in the case of short tool bit lengths they arrive at the tool bit essentially at the same time, as well as for long tool bit lengths.

The drilling blow has a total shock energy made up of rotary shock energy afforded by the torsional blow component and axially directed shock energy formed by the axially directed blow component. As a result, the following formula applies:

$$0.02 < E_t/E_l \bullet D < 0.5$$

where $E_t$ represents the rotary shock energy, $E_l$ represents the axially directed shock energy, with D, measured in millimeters, designating the diameter of the tool bit clamped in the tool bit chuck. Within the preferred range of the blow energies of the two blow components, a good axially directed penetration of the tool bit tip into the base material and a sufficient reduction by shearing stress is assured.

In one preferred embodiment of the manually operated tool of the present invention, the motor actuated striking mechanism is arranged for producing one of the two blow components, preferably the second blow component is generated by mechanical conversion of a portion of the shock energy of the first blow component with the assistance of the means for generating the drilling blow. In this way, the experience with known hammer drills with an axially directed blow assist can, for instance, be utilized. The axially directed blow is preferably produced by an electropneumatic blow or striking mechanism and is converted into the drilling blow by the use of known physical principles. In particular, such principles include the effects of a wedge, a lever, pressure propagation, elastic shear deformation or lateral contraction. These can be used for producing the second blow component.

It is advantageous in hammer drills with a striking mechanism for generating axially directed blows, that the means for producing the drilling blows is afforded by links or sliding blocks and/or entrainment faces cooperating with one another so that a portion of the impulse of the axially directed blows can be converted into a torque and superimposed as a torsional blow component on the axially directed blow component. As has been indicated above, the direction of rotation of a force vector at the tip of the tool bit depends upon the relative share of the two blow components. The means for generating the drilling blows are preferably located within a housing of the tool. In tools with an electropneumatic striking mechanism for producing axially directed blows, a free piston is directed towards an anvil, and the anvil, in turn, is directed towards a trailing end of the tool bit.

In another embodiment, the means for producing the drilling blows can be arranged as an adaptor with one end inserted into the tool bit chuck of the hammer drill and the second end arranged as a chuck to receive the tool bit. Preferably, the adaptor includes a housing with one end, its leading end, formed as a chuck for the tool bit with the other or trailing end arranged for insertion into the chuck of a manually operable hammer drill with a motor driven striking mechanism for generating the axially directed blows introduced into a continuously rotating tool bit chuck. Within the housing, links cooperating with one another and/or entrainment faces are arranged so that the impulse of the axially directed blows can be converted into a torque and superimposed on the axially directed blows as a torsional blow component. Such an adaptor can be easily inserted into the tool bit chuck of an existing hammer drill with an axially directed striking mechanism in order to direct such tools for producing a drilling blow in accordance with the present invention.

In a particularly desirable embodiment of the invention, the hammer drill is provided to make a striking mechanism for producing axially directed blows and with means for producing drilling blows being disposed between the striking mechanism and a tool bit chuck, and comprising a rotor rotatable with controlled RPM in the field of a stator. This rotor substitutes for a conventional anvil in known hammer drills. Axially directed blows are applied to the rotor by a free piston in the striking mechanism. Due to the shock produced by the free piston, the rotor is thrust due to the high force against the trailing end of the tool bit and is stopped in a shock-like manner by a design of the contact faces having high friction surfaces. In this manner, a torsional wave is formed at the trailing end simultaneously with the axially directed shock wave and both are transmitted to the tool bit. A share of the torsion blow component in the drilling blow can be regulated by the RPM of the rotor and in this way the direction of the force vector at the tip of the tool bit can be controlled.

In still another preferred embodiment of the present invention, where the hammer drill has an axially directed striking mechanism, the drilling blows are developed directly in the drive motor of the tool bit chuck. For this purpose, the drilling blows are developed by a regulation mechanism which can superimpose torque peaks on the continuous rotation of the tool bit chuck. In a preferred variation, sensors are also provided which permit monitoring of transmission of the axially directed blows to the tool bit and the regulation mechanism can be controlled in such a way that torque peaks are always superimposed when an axially directed blow is transmitted to the tool bit.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

BRIEF DESCRIPTION OF THE DRAWINGS

In the drawings:

FIG. 2 is an exploded view of another embodiment showing only a portion of a hammer drill;

FIG. 3 is an axially extending panel view of a third embodiment of the present invention shown partly in section; and FIG. 4 is a side elevational view of a still further embodiment of the present invention shown partially in section.

DETAILED DESCRIPTION OF THE INVENTION

Figure 1:
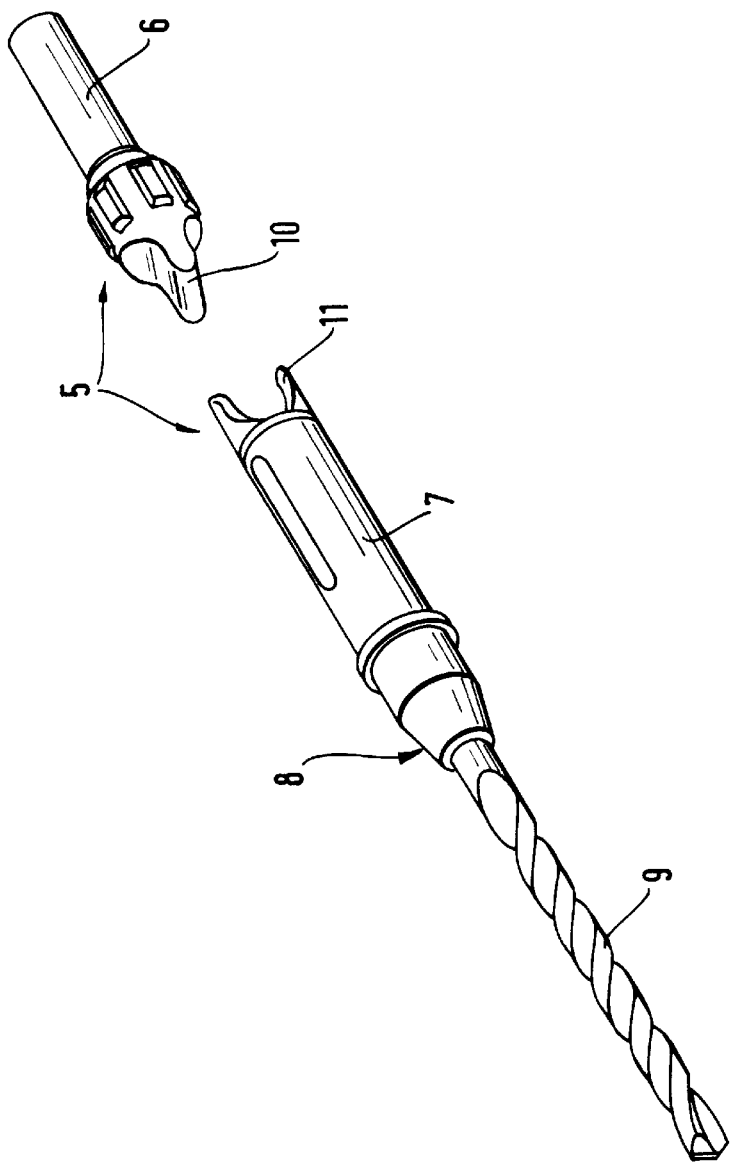
FIG. 1 is an axially extending exploded view of a first embodiment of the present invention.

In FIGS. 1–3 various embodiments of a hammer drill are shown incorporating the present invention and comprising a motor driven striking mechanism 1 for producing axially directed impulse-blows. The striking mechanism 1 is formed of a electropneumatic blow producing device and is a component of the hammer drills provided by Hilti Aktiengesellschaft described in Hilti's catalogue entitled "System Solutions for the Building Industry, 1994/95" at pages 56–75. As illustrated in FIG. 1, the striking mechanism 1 includes a motor driven eccentric disk 2 connected to an exciter piston 3 which can be periodically moved back and forth in a cylindrical piston guide in an axial direction of an axially elongated tool bit 9. Due to the periodic axial movement of the exciter piston 3, a free piston 4 located inside the piston guide is accelerated and strikes the rear end of an anvil 6 extending in the axial direction. Accordingly, the kinetic energy of the free piston 4 is transmitted in the form of an axially directed impulse blow to the anvil 6. An air cushion is located between the exciter piston 3 and the free piston 4 which prevents the rebounding of the free piston 4 from striking the exciter piston 3. The drive motor for the exciter piston 3 is at the same time the drive for a tool chuck 8 (note FIG. 2). The tool bit 9 is secured in the tool bit chuck 8, for instance, a rock drill provided with helical flutes which is continuously rotated about its axis by the drive motor. The anvil 6 transmits the axially directed blows to the tool bit secured in the chuck 8.

Means 5 are arranged in the axial extension of the striking mechanism 2 and the axially directed blows transmitted to the anvil 6 by the free piston 4 are transformed into drilling blows. Each drilling blow is composed of an axially directed blow component and a torsional blow component. The torsional blow component is produced from the axially directed blow by converting a portion of the shock energy of the axially directed blow into a rotary shock energy. Preferably, this is achieved mechanically by providing the front end of the anvil 6 and the trailing end of a component 7 connected to the tool bit 9 with cooperating links 10, 11 and/or entrainment faces. The cooperating links 10, 11 slide along one another according to the wedge principle and transform a portion of the shock energy of the axially directed blows into a rotary shock energy. The share of the transformed shock energy of the axially directed blows depends on the slope or incline of the surfaces cooperating with one another.

A pair of levers can also be provided as another embodiment for the force redirection equivalent to the sliding inks, such as a pair of levers for converting a portion of the energy of the axially directed blow into a rotary blow in cooperation with the axial displacement of the anvil with the drilling blow being transmitted together with the remaining axially directed blow as a torsional blow into the tool bit 9. In this arrangement, the tool bit 9 is returned after each blow into a defined initial position relative the initiation of the next blow due to the superimposed rotary movement. Accordingly, in addition to the levers, a collar is provided for axially limiting the return motion. In an other blow transformation embodiment equivalent to the above, the redirection of the force is achieved by a pair of balls disposed between the anvil and the tool bit. The conversion of a portion of the blow or shock energy of the axially directed blow into a rotary shock energy is achieved by mutual rolling contact of the balls. In such a case, an axial limitation of the return motion of the tool bit into a defined original position for the introduction of the next blow is provided.

The component 7 cooperating with the anvil can be shaped as a second anvil and comprises a tool bit chuck 8 for the trailing end of the tool bit 9. It is also possible, however, to connect the tool bit so as to form a single unit and provide a special insertion end 7 on the tool bit 9.

The function of the embodiment of the hammer drill displayed in FIG. 2 corresponds to that of the embodiment in FIG. 1. In the second embodiment, the means 5 for producing the drilling blow are formed as an adaptor which can be secured in the tool bit chuck 8 of a hammer drill incorporating an axially directed striking mechanism. The adaptor comprises a housing 12 having a leading end facing in the drilling direction provided with a tool bit chuck 13 and a trailing end for insertion into the continually rotating tool bit chuck 8 of a manually operated hammer drill. The interface with the hammer drill is designed as an insertion or trailing end and comprises rotary entrainment grooves and axially extending grooves for fixing the tool in the axial direction and securing the adaptor 5 in the tool bit chuck 8. The links 10, 11, cooperating with one another and/or entrainment faces can convert or transform a portion of the shock energy of the axially directed blows into a rotary shock, are located inside the housing. According to the embodiment shown, the links 10, 11 cooperating with one another are disposed at the rod-shaped interface element 14 to the hammer drill and at the insertion end of the tool bit 9.

In the embodiment of the invention illustrated in FIG. 3, the anvil is formed as a rotor 16 of a motor which rotates in the field of a stator 15 in between the axially directed shocks or blows of the free piston 4. The axially directed motion of the free piston 4 is indicated by the arrow L and the rotational motion of the anvil is represented by the arrow R.

During the axially directed shock L provided by the free piston 4, a rotating anvil is pressed with great force against the trailing end of the tool bit 6 secured in the tool bit chuck. The contact faces are, for instance, provided with positive locking arrangements or have high coefficients of friction. Accordingly, the rotating anvil is stopped in a shock-like manner upon contact with the trailing end of the tool bit. This affords a torsional wave induced at the trailing end of the tool bit simultaneously with the introduction of the axially directed shock wave. The additional rotational energy for producing a drilling blow supplied by the means 5, formed as a motor 15, 16, is converted into a rotory shock by the rotating anvil 16. For drilling blow energy of approximately three watts a blow, the required motor power of the additional electric motor amounts to approximately 103 watts. In an alternate embodiment, the free piston can replace the anvil and be accelerated not only in the axial direction but also rotationally. In another variation, apart from the basic concept of an electrodynamic striking mechanism for producing axially directed blows, the axially directed and rotationally directed acceleration of the free piston can be produced by the same rotor winding. In such an arrangement, the free piston produces the axially and torsionally directed shock which are superimposed onto a drilling blow transmitted to the tool bit with or without an anvil.

FIG. 4 displays another embodiment of the hammer drill embodying the present invention and has a motor driven striking mechanism 1 located inside the tool housing for producing axially directed blows. A motor M drives an eccentric disk 2 connected to an exciter piston 3 which periodically is displaced axially in a cylindrical piston guide. Exciter piston 3 accelerates a free piston 4 which strikes axially against the trailing end of an anvil 6. Axially directed blows are transmitted in this way through a tool bit 9 secured in a continuously rotatable tool bit chuck 8. Accordingly, the tool corresponds to a known hammer drill with an electropneumatic striking mechanism for producing blows. According to the invention the tool is equipped with means 5 for generating a drilling blow. These means 5 comprise a regulation mechanism 17 by means of which torque peaks can be superimposed on the continuous rotation of the tool bit chuck 8. Sensors 18 are provided in the contact region between the free piston 4 and the anvil 6 which monitor the transmission of the axially directed blows to the tool bit. In an alternate variation, the instant of a blow is detected by proximity sensors monitoring the motion of the eccentric disk 2.

The information about the moment the blow occurs is further transmitted to the regulation mechanism 17 which includes an electronics evaluation system. The regulation mechanism 17 issues a scanning pulse to the actuation electronics of the drive motor M. Accordingly, the actuation electronics of the drive motor M produces a current pulse, which generates an additional impulse-like torque through the field magnet of the motor M whenever an axially directed blow is transmitted to the tool bit 9. In this way, a torque is superimposed on the axially directed blow produced by the blow generating mechanism 1 and results in a drilling blow at the tip of the tool bit 9 in engagement with the base material.

The design of the manually operated tool embodying the invention for drilling or removing material from brittle or low ductile materials has been described using a hammer drill with a striking or blow generating mechanism for providing axially directed blows, in particular, with an electropneumatic axially directed striking mechanism.

It goes without saying, however, that the principle of the transformation of a part of the shock energy also works on the basis of a torsional striking mechanism, in the same manner as the shock energy of an axially directed blow can be partially converted into a torsional blow component, the shock energy of a torsional blow can be partially transformed into an axially directed blow component. In a completely analogous manner, the means for generating the drilling blow preferably comprises links cooperating with one another and/or entrainment faces. The blow components generated in this manner are again superimposed to form a drilling blow which causes a chisel-like or shear-like working of the base material.

Base materials of great hardness and reinforced concrete can be very efficiently worked by the drilling blow. When reinforcing steel is impacted during the drilling operation, it is not necessary to interrupt the drilling and start another hole. Partial or direct impacts upon the reinforcing steel no longer results in surprising torque peaks, since the reinforcing steel is cut by shear stress.

While specific embodiments of the invention have been shown and described in detail to illustrate the inventive principles, it will be understood that the invention may be embodied otherwise without departing from such principles.

We claim:

1. A hand held tool for drilling and/or removing material in at least one of brittle material and low ductile material, such as a manually operable hammer drill, comprising a tool housing and a tool bit chuck (8) protruding from said tool housing and continuously rotating about an axis, a motor driven striking mechanism (1) arranged within said tool housing for transmitting a first blow component to an axially extending tool bit (9) clamped in said chuck (8), and arranged within said housing a means (5) for producing and superimposing a second blow component on the first blow component for transmitting an impulse-like drilling blow comprising an axially directed blow component and a torsional blow component to said tool bit (9) rotating continuously in said chuck (8).

2. A hand held tool for drilling and/or removing material in at least one of brittle material and low ductile material, such as a manually operable hammer drill, comprising a tool housing and a tool bit chuck (8) protruding from said tool housing and continuously rotating about an axis, a motor driven striking mechanism (1) arranged within said tool housing for transmitting a first blow component to an axially extending tool bit (9) clamped in said chuck (8), and arranged within said housing a means (5) for producing and superimposing a second blow component on the first blow component for transmitting an impulse-like drilling blow comprising an axially directed blow component and a torsional blow component to said tool bit (9) rotating continuously in said chuck (8), the first blow has a shock energy composed of a rotational shock energy of the torsional second blow component and of a axially directed shock energy of the axially directed first blow component based on the formula:

$$0.02 < E_t/E_l \cdot D < 0.5$$

where $E_t$ designates the rotational shock energy and $E_l$ designates the axially directed shock energy with D measured in millimeters designating the diameter of the tool bit (9) clamped in the tool bit chuck.

3. A hand held tool, as set forth in claim 1 or 2, wherein said striking mechanism (1) being driven by a motor for producing the first blow as an axially directed blow, and said means converting the first blow into said first and second blow components comprises a mechanical device for conversion of a share of the shock energy of the first blow.

4. A hand held tool, as set forth in claim 3, wherein said mechanical device comprises at least one of links (10, 11) and entrainment faces cooperating with one another, so that a portion of the shock energy of the axially directed blows is transformed into a rotational shock energy and can be superimposed as said torsional second blow component on said axially directed first blow component.

5. A hand held tool, as set forth in claim 1, wherein said striking mechanism (1) produces axially directed blows and said means (5) for converting drilling blows from the axially directed blows being located between the striking mechanism (1) and said tool bit chuck (8) and comprises a rotor (16) rotating in a field of a stator (15) with regulable RPM, said rotor receiving axially directed blows from a free piston (4) of the striking mechanism (1) and said rotor transmits axially directed blows together with a torque resulting from its rotation to the tool bit (9).

6. A hand-held tool, as set forth in claim 1, wherein said striking mechanism (1) generates axially directed blows and said means (5) for generating drilling blows comprises a regulating mechanism (17) by means of which torque peaks can be superimposed upon the continuously rotating tool bit chuck (8).

7. A hand-held tool, as set forth in claim 6, wherein sensors (18) being provided for monitoring the transmission of axially directed blows to said tool bit (9) and the regulation mechanism (17) being controlled via said sensors (18) so that the torque peaks are superimposed when an axially directed blow is transmitted to the tool bit (9).

* * * * *